United States Patent [19]
Seki et al.

[11] Patent Number: 5,444,511
[45] Date of Patent: Aug. 22, 1995

[54] DISTANCE MEASURING DEVICE FOR CAMERA

[75] Inventors: Yoichi Seki; Hiroyuki Saito; Akira Ito; Isamu Ishii; Yoshiyuki Iwamatsu, all of Yotsukaido, Japan

[73] Assignee: Seikosha Co., Ltd., Japan

[21] Appl. No.: 144,827

[22] Filed: Oct. 29, 1993

[30] Foreign Application Priority Data

Oct. 29, 1992 [JP] Japan .................. 4-291342
Dec. 28, 1992 [JP] Japan .................. 4-348385
Feb. 1, 1993 [JP] Japan .................. 5-014646
Oct. 8, 1993 [JP] Japan .................. 5-253266

[51] Int. Cl.$^6$ .................................. G03B 13/36
[52] U.S. Cl. .................................. 354/403
[58] Field of Search .................. 354/402, 403; 250/201.4; 356/1, 4

[56] References Cited

U.S. PATENT DOCUMENTS

| | | | |
|---|---|---|---|
| 4,673,274 | 6/1987 | Nagaoka et al. | 354/403 |
| 4,760,419 | 7/1988 | Fujiwara et al. | 354/403 |
| 4,796,044 | 1/1989 | Amanuma et al. | 354/403 |
| 4,977,457 | 12/1990 | Tamekuni et al. | 354/403 X |
| 5,008,695 | 4/1991 | Nagaoka et al. | 354/403 |
| 5,068,540 | 11/1991 | Tsuji | 356/4 X |
| 5,157,435 | 10/1992 | Min et al. | 354/403 |
| 5,204,714 | 4/1993 | Nonaka et al. | 354/403 |

FOREIGN PATENT DOCUMENTS

0300663 1/1989 European Pat. Off. .

Primary Examiner—W. B. Perkey
Attorney, Agent, or Firm—Adams & Wilks

[57] ABSTRACT

A distance measuring device may be constructed utilizing a reduced number of components by calculating distance on the basis of the duration of an integration. Pulsed light is projected toward an object. A selecting circuit selectively outputs one of a pair of output voltages from two current-voltage converting circuits, each of which is connected to a position sensitive device which is configured to receive light reflected from the object. A variable-gain amplifying circuit is used for amplifying the selected output voltage and for producing an amplified output voltage. The output voltage of the amplifying circuit is integrated by an integrating circuit. Reference voltage generating circuitry generates two reference voltages having different levels and a comparing circuit compares the output voltage of the integrating circuit with one of a pair of reference voltages. Gain selecting circuitry is used for determining the gain of the variable-gain amplifying circuit on the basis of the output result of the comparing circuit. The distance to the object is determined in accordance with the duration of time that integration is performed by the integrating circuit until the integrated output voltage exceeds one of the reference voltages. Thus, distance may be determined in accordance with the magnitude of the integrated output voltage, the number of times integration is performed or the number of light projections performed by the device.

14 Claims, 10 Drawing Sheets

DISTANCE MEASURING DEVICE FOR CAMERA

BACKGROUND OF THE INVENTION

The present invention relates to a distance measuring device for a camera and the like, and more particularly to an active-type distance measuring device for a camera.

A variety of active-type distance measuring devices have been conventionally proposed. In these distance measuring devices, a light projecting circuit operates a predetermined number of times (or for a predetermined period of time), and then an optical signal from the object is amplified and its voltage integrated and converted in an A/D manner to thereby calculate the distance to the object.

However, a plurality of comparators for converting the voltage across the terminals of an integrating capacitor into a digital signal are required in such a distance measuring device, as described, for example, in Japanese Patent Application Laid-Open No. 3-119307. In addition, since the resolution is in proportion to the number of such comparators, if the distance measuring precision is to be enhanced, the circuit would have to be enlarged and would become more complicated and expensive.

SUMMARY OF THE INVENTION

A main object of the present invention is to provide a distance measuring device for a camera or the like which solves the above-described problems.

According to one aspect of the present invention, a distance measuring device for a camera comprises light projecting means for projecting light to an object; light receiving means for receiving the light projected from the light projecting means and reflected by the object and for converting it into two current outputs; a first current-voltage converting circuit for converting one of the output currents of the light receiving means into a first voltage; a second current-voltage converting circuit for converting the other of the output currents of the light receiving means into a second voltage; a selecting circuit for selectively outputting either one of the first and second voltage outputs from the two current-voltage converting circuits; an amplifying circuit for amplifying the voltage output signal of either one of the first and second current-voltage circuits selected by the selecting circuit; gain selecting means for selecting a gain of the amplifying circuit; an integrating circuit for integrating the output of the amplifying circuit; reference voltage generating means for generating two kinds of reference voltages; and comparing means for comparing the output of the integrating circuit with one of the reference voltages generated by the reference voltage generating means.

According to another aspect of the present invention, a distance measuring device for a camera comprises light projecting means for projecting pulse light to an object; light receiving means for receiving the light projected from the light projecting means and reflected from the object; two output generating means for generating analog signals corresponding to the distance to the object in response to an output of the light receiving means; two amplifying circuits for amplifying output signals of the output generating means; an integrating type of analog/digital converting circuit for converting an output signal of the amplifying circuit into a digital signal; and a level judging circuit for judging a level of an output signal of the integrating type of analog/digital converting circuit.

The gain of the light receiving circuit may be changed stepwise. At the time of starting a distance measuring operation, the gain is kept at a maximum, a pulse light is projected a predetermined number of times to the object, the signal light reflected from the object is integrated, and when the integrated voltage exceeds a predetermined voltage, the gain is reduced. The above-described operation is repeated until the integrated voltage is decreased below the predetermined voltage.

The pulse light is projected to the object to be photographed. The light signal from the object is integrated by two sets of far-distance/near-distance light receiving circuits until a predetermined voltage is reached, during which the number of light projections is counted. The distance to the object is calculated based upon the two count values.

DETAILED DESCRIPTION OF INVENTION

One embodiment of the invention will now be described with reference to FIG. 1. A light projecting circuit 10 comprises a drive circuit for driving an infrared light emitting diode 14 (IRED) and is composed of a transistor 11, a base resistor 12, a collector resistor 13 and the IRED 14. The IRED 14 is pulse driven by a light projection signal Ve output from an arithmetic circuit of a CPU 80 and emits a pulsed beam of infrared light. The emitted light passes through a light projection lens 1, and a part of the light is reflected by an object (not shown) which is to be photographed and whose distance is to be measured. A part of the reflected light from the object passes through a light receiving lens 2 and is incident on a semiconductor position sensitive device 3 (PSD).

A current-voltage converting circuit 20 (corresponding to a far-distance side) and a current-voltage converting circuit 30 (corresponding to a near-distance side) form a light receiving circuit together with the PSD 3. When the optical signal is incident on the PSD 3, the PSD 3 outputs currents to the current-voltage converting circuit 20 and the current-voltage converting circuit 30 in response to the intensity of the optical signal and the incident position thereof on the PSD 3. The current-voltage converting circuit 20 is composed of an amplifier 21 and a feedback resistor 22 and outputs a voltage in proportion to the input current. The current-voltage converting circuit 30 is composed of an amplifier 31 and a feedback resistor 32 in the same manner as the current-voltage converting circuit 20 and outputs a voltage in proportion to the input current. The outputs of the two current-voltage converting circuits 20 and 30 are applied to different terminals of a switch 4.

The switch 4 functions to transmit the output of either the current-voltage converting circuit 20 or the current-voltage converting circuit 30. The switching state or condition of the switch 4 is controlled by the CPU 80. When the measuring operation on the far distance side is performed, the current-voltage converting circuit 20 is turned on, whereas when the measuring operation on the near distance side is performed, the current-voltage converting circuit 30 is turned on.

An amplifying circuit 40 and an amplifying circuit 50 are amplifiers whose gains are switchable. Both amplifying circuits have the same construction so that an explanation will be made only for the amplifying circuit 40. A coupling capacitor 5 is connected before the amplifying circuit 40 for interrupting the DC current component of the input signal fed to the amplifying circuit. The amplifying circuit 40 is composed of an amplifier 41 and three feedback resistors 43, 44 and 45 for amplifying the input signal at a preselected constant gain. The amplifying circuit 40 has a switch 46 and a switch 47 which may be controlled in an on/off manner by the CPU 80 to selectively change the gain. The switch 46 turns the feedback resistor 43 on or off and the switch 47 turns the feedback resistors 43 and 44 on or off, and the gain of the amplifier 41 is changed stepwise in accordance with the switching condition of these switches. Accordingly, the amplification is performed in response to the changed gain, and an amplified voltage is output to the amplifying circuit 50. The amplifying circuit 50 operates in the same way as the amplifying circuit 40. The CPU 80 selectively operates a switch 56 and a switch 57 to set a suitable gain through resistors 53, 54 and 55. In this manner, the amplification of the output signal from the amplifying circuit 40 is carried out, and the amplifying circuit 50 outputs an amplified output signal through a switch 7 to the next stage, an integrating circuit 60.

The integrating circuit 60 is composed of an amplifier 61, an input resistor 62, an integrating capacitor 63, a switch 64 and a voltage follower 65 for integrating the input voltage on a time basis. Prior to the integrating operation, the switch 64 is turned on for discharging any charge remaining in the integrating capacitor 63. When the charge has been sufficiently discharged, the switch 64 is turned off. When the integrating operation is started by turning on the switch 7, the time basis integrated value of the input signal is stored in the integrating capacitor 63 as a charge. The value of the voltage Vi across the terminals of the integrating capacitor 63 at this time is output to a comparator 71. When the integrating operation has been finished, the switch 7 is turned off.

A comparing circuit 70 is composed of the comparator 71, a reference power supply 73 and a reference power supply 74 for comparing a level of the input voltage Vi. The comparator 71 compares the value of the input voltage Vi with a reference voltage V1 of the reference power supply 73 or a reference voltage V2 of the reference supply 74 selected by a switch 72. When the input voltage is higher than the reference voltage, an "H" level is output to the CPU 80, whereas when the input voltage is lower than the reference voltage, an "L" level is output to the CPU 80.

The operation of the circuit in accordance with the FIG. 1 embodiment of the invention will next be explained. When the operation enters into the distance measuring routine, first of all, the power supplies shown in FIG. 1 are all turned on. Subsequently, the content of a read/write storage device, such as a RAM 81, is cleared, and the gains of the amplifying circuit 40 and the amplifying circuit 50 are determined. In the case where, in the operation of determining the gains, it is determined that the object is located at a position within a certain distance, since the closest flag in the RAM 81 is set, then the determination is that the object is located at the closest distance position without any distance measuring operation. Thereafter, the distance measuring operation on the far distance side is performed by the current-voltage converting circuit 20 and a number of times N1 is stored in the RAM 81. In the case where it is determined that the object is located out of a certain distance during the distance measuring operation on the far distance side, since an infinite flag in the RAM 81 is set, then the determination is that the object is located at the infinite distance position. Furthermore, thereafter, the distance measuring operation is performed by the current-voltage converting circuit 30 and a number of times N2 is stored in the RAM 81. When the foregoing distance measuring operation is complete, if the infinite flag is set, the object is located at the infinite position, if the closest flag is set, the object is located at the closest position, and in other cases, the following value X is calculated by using the numbers of times N1 and N2 stored in the RAM 81.

$$X = N1/(N1+N2)$$

Figure 5:
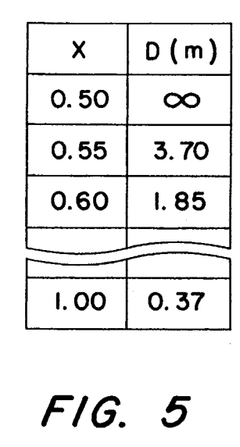
FIG. 5 is a part of a lookup table of a ROM in which the distance is obtained from the X value in accordance with the present invention.

When the value X is determined, the distance to the object is obtained with reference to a predetermined address of a readable storage device, such as a ROM 82, as shown in FIG. 5. Instead of using a readable storage device, the object distance can be determined from the value X using a PLA, distributed gate logic, and the like. Finally, the power supply of the distance measuring circuit is turned off to finish this routine.

Figure 2:
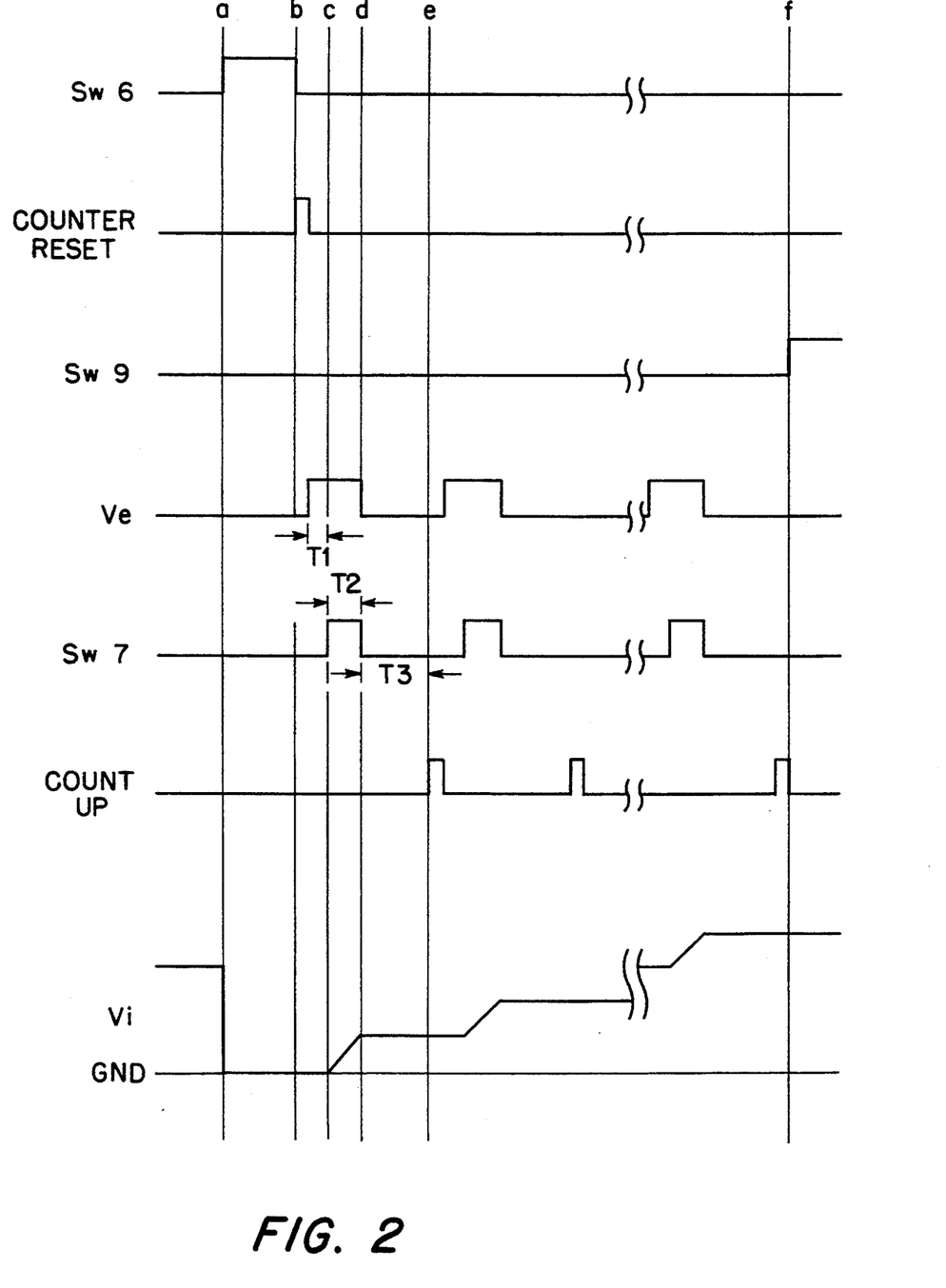
FIG. 2 is a timing diagram for explaining an integrating operation according to the present invention.

The operation for determining the gains of the amplifying circuit 40 and the amplifying circuit 50 will be explained with reference to FIGS. 2 and 3. First of all, the switch 4 is turned on to the current-voltage converting circuit 20 by the CPU 80. The switch 72 is turned on to the reference power supply 73 side, and the switch 64 is tuned on so that the charge left in the integrating capacitor 63 is discharged (FIG. 2). After the charge has been sufficiently discharged, the switch 64 is turned off and then the number of times N1 of a counter 83 is cleared to zero. Then, the light projecting circuit 10 is operated by the CPU 80 to thereby start the light projection. In order to wait for a rising-delay time of each amplifier and to suppress the effect of the change in power supplies concomitant with the start of the light projection, the integrating circuit 60 is operated only during a time period T2 after a time period T1 from the light projection. After that, the light projection and the integration are stopped, the waiting state continues for a time period T3, and 1 is added to the counter.

Figure 3:
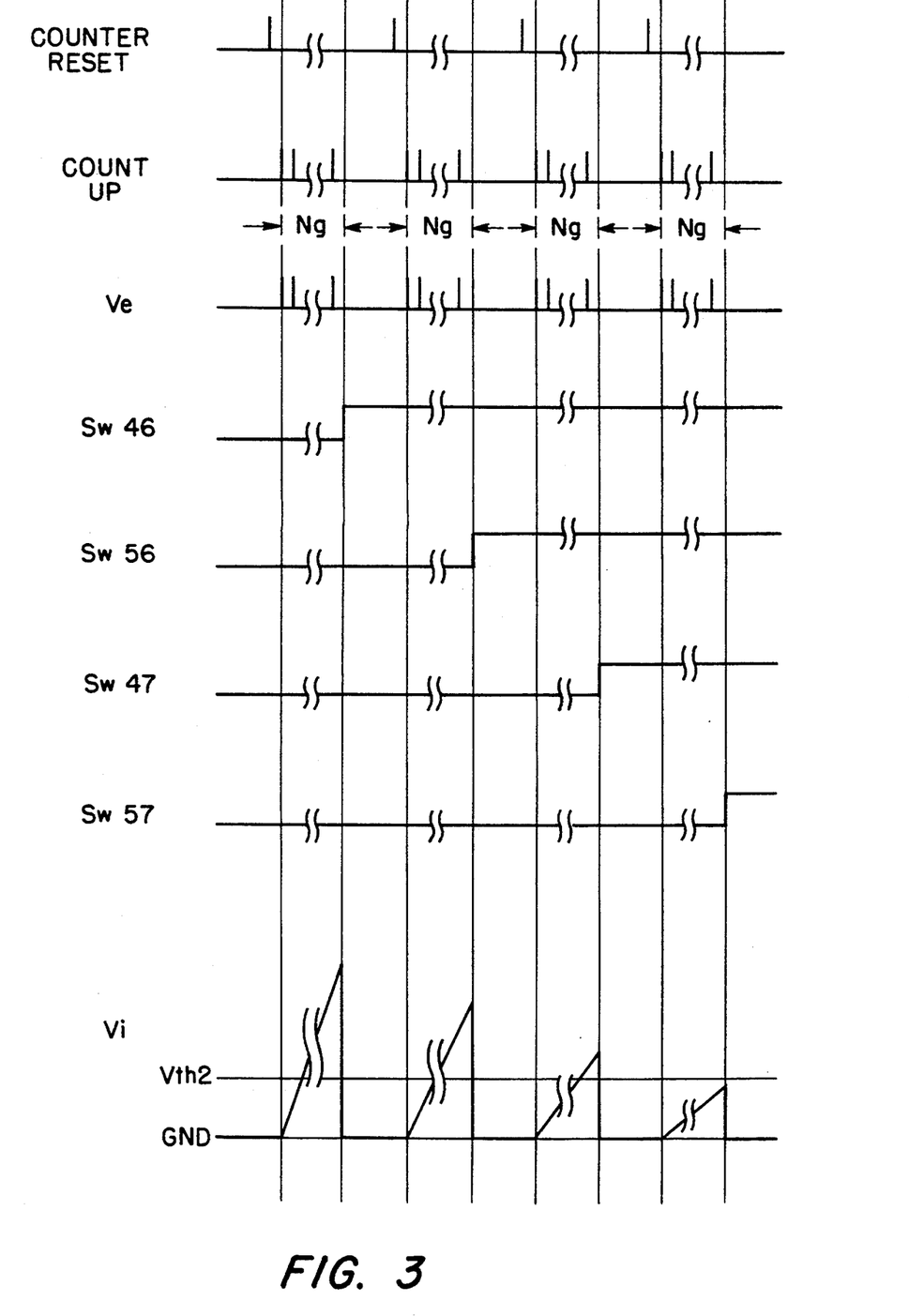
FIG. 3 is a timing diagram for explaining a gain determining method of amplifying circuits according to the invention.
Figure 4:
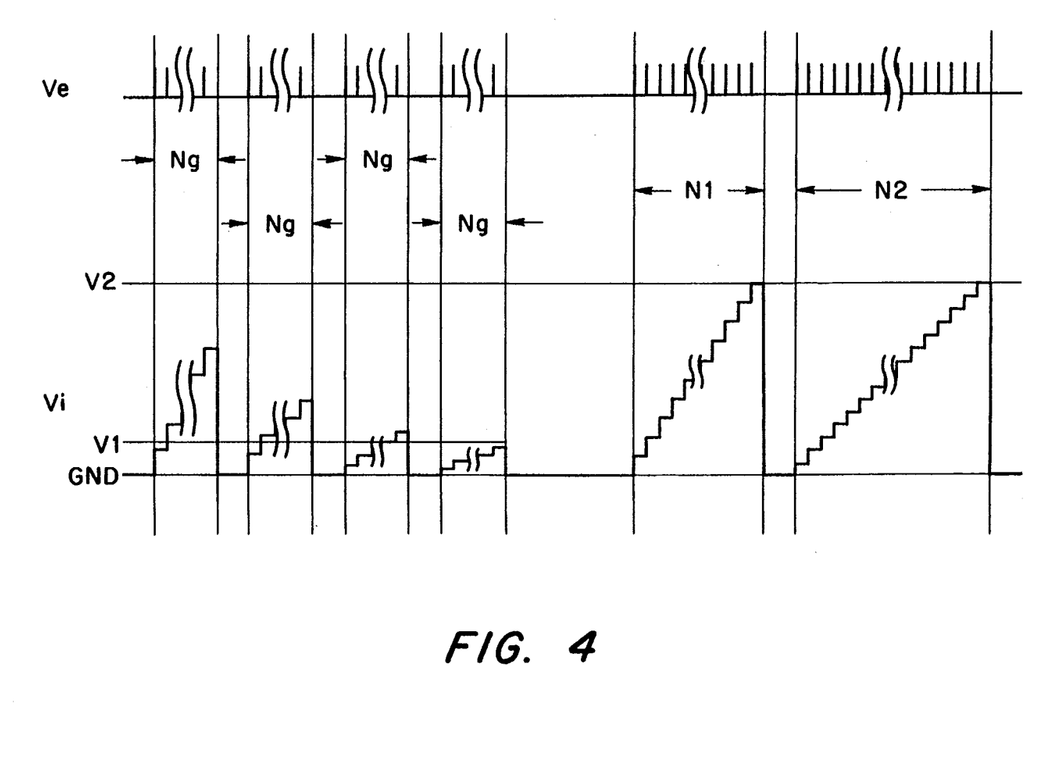
FIG. 4 is a timing diagram for explaining a series of operations when the distance measurement is performed according to the present invention.

As shown in FIG. 3, after this operation has been repeated by the predetermined number of times Ng (for example, ten times), the switch 7 is turned off and the voltage across the terminals of the integrating capacitor 63, i.e., an integrated voltage Vi, is output to the comparator 71 which compares the voltage Vi with the reference voltage V1 of the reference power supply 73 and converts the result into a digital signal Vo to be output to the CPU 80. When the output of the comparator 71 is "H" level, the switch 46 is turned on by the CPU 80. In the same way, the integrating operation and the comparison computation are repeated, and if the output of the comparator 71 is "H" level, the switch 56, the switch 47 and the switch 57 are turned on in this order. If the output of the comparator 71 is "H" level even if all the switches are turned on, the closest distance flag is set. Thus, the gain of the amplifying circuits as a whole has been determined.

The distance measuring operation by the current-voltage converting circuit 20 will be explained with reference to FIG. 2. First of all, the switch 64 is turned on and the charge remaining in the integrating capacitor 63 is discharged. After the charge has been sufficiently discharged, the switch 64 is turned off. Then, the number of times N1 of the counter 83 is cleared to zero. The switch 72 is turned on to the reference power supply 74.

Subsequently, the distance measuring operation is started. The method for measuring the distance is shown in FIG. 2. Every time when repeating the light projection, 1 is added to the number of times N1. At the time when the integrated voltage Vi has reached the reference voltage V2 of the reference power supply 74, the operation is completed. However, if the integrated voltage has not reached the voltage V2 even if the light projection would be performed the predetermined number of times Nm because the distance to the object is too far, it is determined that the object is located at the infinite distance position, and the infinite flag in the RAM 81 is set to complete the operation. Except for this condition, the number of times N1 left in the counter 83 is stored in the RAM 81 upon the completion of the distance measuring operation.

Subsequently, the distance measuring operation by the current-voltage converting circuit 30 will be described with reference to FIG. 2. First of all, the switch 64 is turned on so that the charge left in the integrating capacitor 63 is discharged. After the charge has been sufficiently discharged, the switch 64 is turned off. The number of times N2 of the counter 84 is cleared to zero. Subsequently, the distance measuring operation is started. The method for measuring the distance is shown in FIG. 2. Every time when repeating the light projection, 1 is added to the number of times N2. At the time when the integrated voltage Vi has reached the reference voltage V2 of the reference power supply 74, the operation is completed. The number of times N2 left in the counter 84 upon the completion of the distance measuring operation is stored in the RAM 81.

Figure 1:
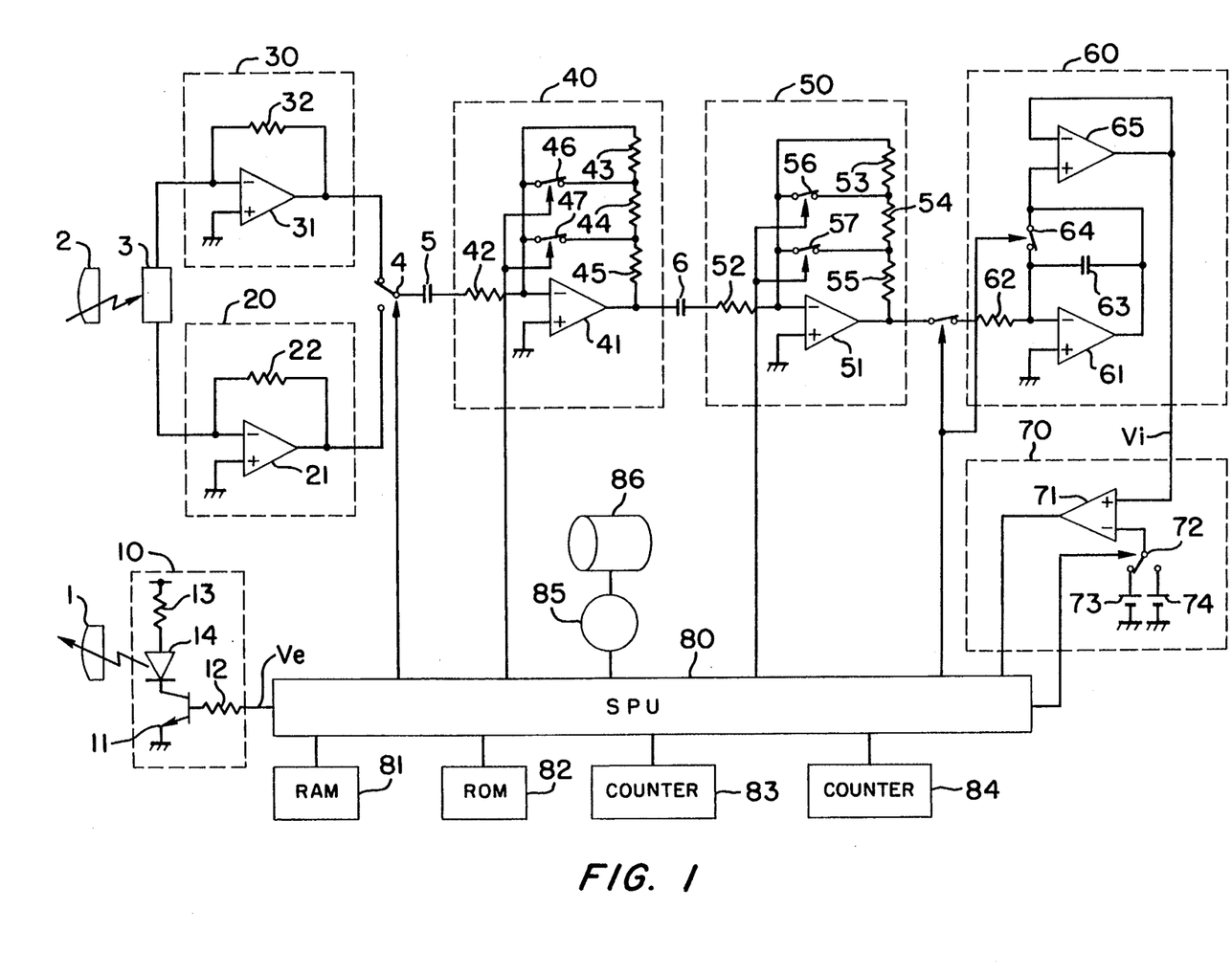
FIG. 1 is a schematic diagram of one embodiment of a distance measuring device according to the present invention.

The operation of the circuit according to the FIG. 1 embodiment has been described above. The foregoing operation is shown in the flowcharts in FIGS. 6 to 11.

Figure 6:
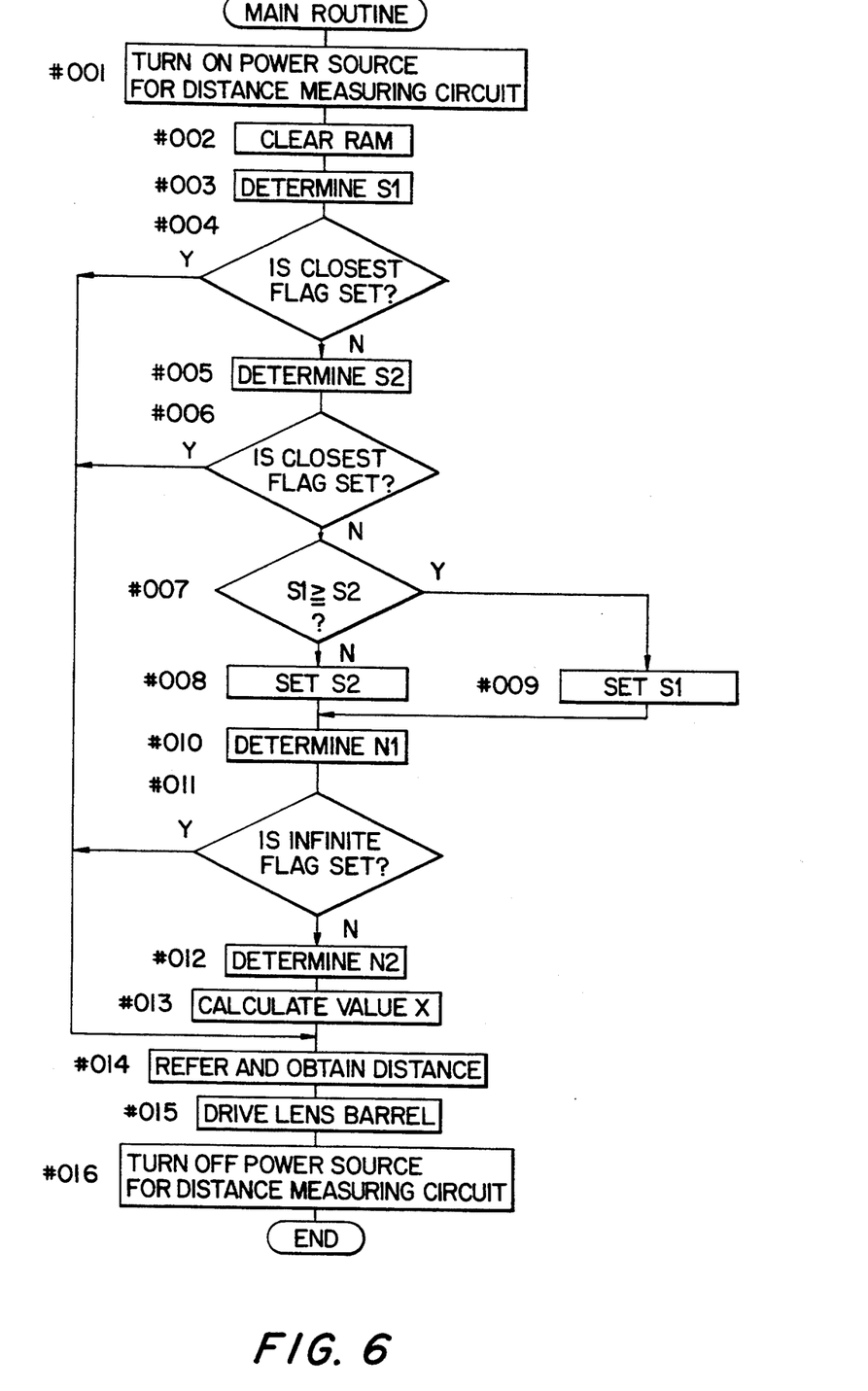
FIG. 6 is a flowchart representing the operation of the present invention.

First of all, the main routine will be explained with reference to FIG. 6. When the operation enters into this routine, the CPU 80 turns on the power supplies of the overall distance measuring circuit (#001) and clears the content of the RAM 81 (#002). Subsequently, a suitable gain of the amplifying circuit 40 and the amplifying circuit 50 is determined using the current-voltage converting circuit 20, and a value S1 corresponding to the gain is stored in the RAM 81 (#003). Then the state of the closest flag is checked. If it is set, the operation jumps to #014 (#004). Further, a suitable gain is determined using the current-voltage converting circuit 30, and a value S2 corresponding to the gain is stored in the RAM 81 (#005). Then the state of the closest flag is checked. If it is set, the operation jumps to #014 (#006). The values S1 and S2 in the RAM 81 are compared (#007) and the switch 46, the switch 47, the switch 56, and the switch 57 are set again according to the switches state of smaller value (#008, #009).

The distance measuring operation is performed by the current-voltage converting circuit 20, and the number of times N1 is stored in the RAM 81 (#010). Then the state of the infinite flag is checked. If it is set, the operation jumps to #014 (#011). In the same way, the distance measuring operation is performed by the current-voltage converting circuit 30 and the number of times N2 is stored in the RAM 81 (#012). The number N1 and the number N2 stored in the RAM 81 by the operation of the subroutines #010 and #012 are read out to calculate the value X (#013). As a result, if the infinite flag is set, it is judged that the object is located at the infinite position, and if the closest flag is set, it is judged that the object is located at the closest position. Except for these condition, the distance to the object is obtained by referring to the address (FIG. 5) of the ROM 82 which is predetermined by the value of X (#014). Then a lens barrel 86 is driven to the focusing position by controlling a motor 85 (#015). Finally, the power supply of the distance measuring circuit is turned off (#016) and the operation changes to another routine.

Next, the operation within each subroutine will be explained. First, a subroutine for determining the value S1 will be described with reference to FIG. 7. The value S1 is 1 byte data which is stored in an address in the RAM 81. When the operation enters into the subroutine for determining the gain of the amplifying circuit 40 and the amplifying circuit 50, the CPU 80 turns on the switch 4 to the current-voltage converting circuit 20, turns on the switch 72 to the reference power supply 73 (#101), clears the value S1 to zero (#102), turns on the switch 64 to discharge the charge left in the integrating capacitor 63 and then turns off the switch 64 after discharging (#103), and clears the number of times N1 of the counter 83 to zero (#104).

Figure 7:
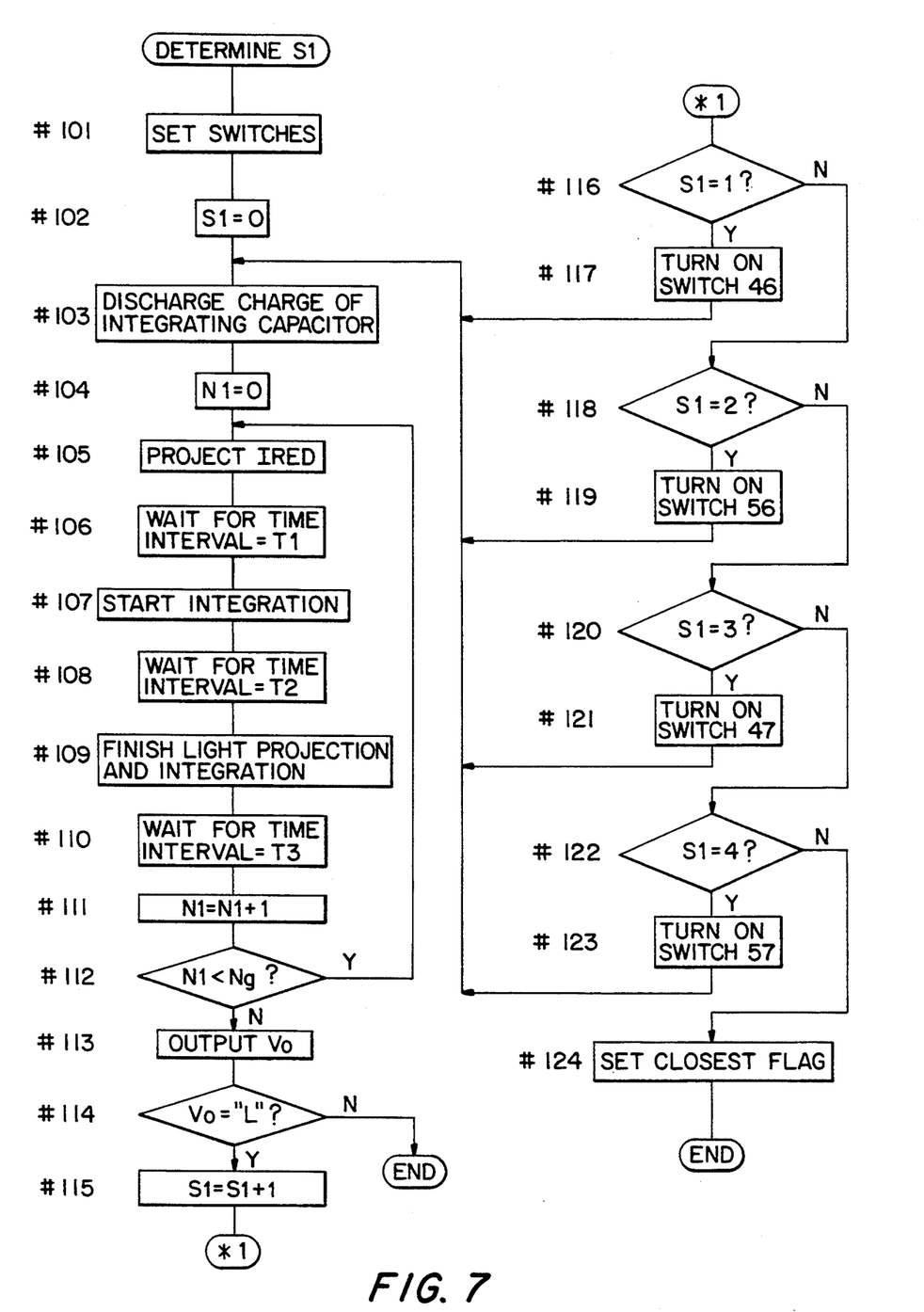
FIG. 7 is a flowchart representing a subroutine to determine a value S1 of the flowchart shown in FIG. 6.

Subsequently, the light projection circuit 10 is operated by the CPU 80 (#105), then the waiting state continues for a time period T1 (#106). Thereafter, the switch 7 is turned on and the waiting state continues for a time period T2 while performing an integrating operation. During this period, the charge is stored in the integrating capacitor 63 (#107, 108). Then, the operation of the light projection circuit 10 is stopped to finish the light projection operation, and the switch 7 is turned off to finish the integrating operation (#109). The waiting state continues for a time period T3 (#110) and one is added to the counter 83 (#111). If the number of times N1 of the counter 83 is less than the number of times Ng determined in advance, the operation jumps to #105

(#112). If the number of times N1 of the counter 83 is more than or equal to the number of times Ng, the integrated voltage Vi is output to the comparator 71. The comparator 71 compares the voltage Vi with the reference voltage V1 of the reference power supply 73, and as the comparison result, outputs a voltage Vo to the CPU 80 (#113). The CPU 80 judges the level of the voltage Vo (#114). If it is "H" level, the operation returns back to the main routine.

In case that the voltage Vo is "L" level, the CPU 80 adds 1 to the value S1 (#115) and then checks whether the value S1 is equal to 1 or not (#116). If it is equal, the switch 46 is turned on so that the gain of the amplifier 41 is reduced (#117), thereafter the operation jumps to #103. Next, the CPU 80 checks whether the value S1 is equal to 2 or not (#119) and if it is equal, the switch 56 is turned on to reduce the gain of the amplifier 51 (#119), thereafter the operation jumps to #103. The CPU 80 then checks whether the value S1 is equal to 3 or not (#120) and if it is equal, the switch 47 is turned on to reduce the gain of the amplifier 41 (#121) and then the operation jumps to #103. Finally, the CPU 80 checks whether the value S1 is equal to 4 or not (#122) and if it is equal, the switch 57 is turned on to reduce the gain of the amplifier 51 (#123) and then the operation jumps to #103. If the value S1 is equal to none of 1 to 4, the closest flag in the RAM 81 is set and the operation changes from the subroutine and returns back to the main routine.

Figure 8:
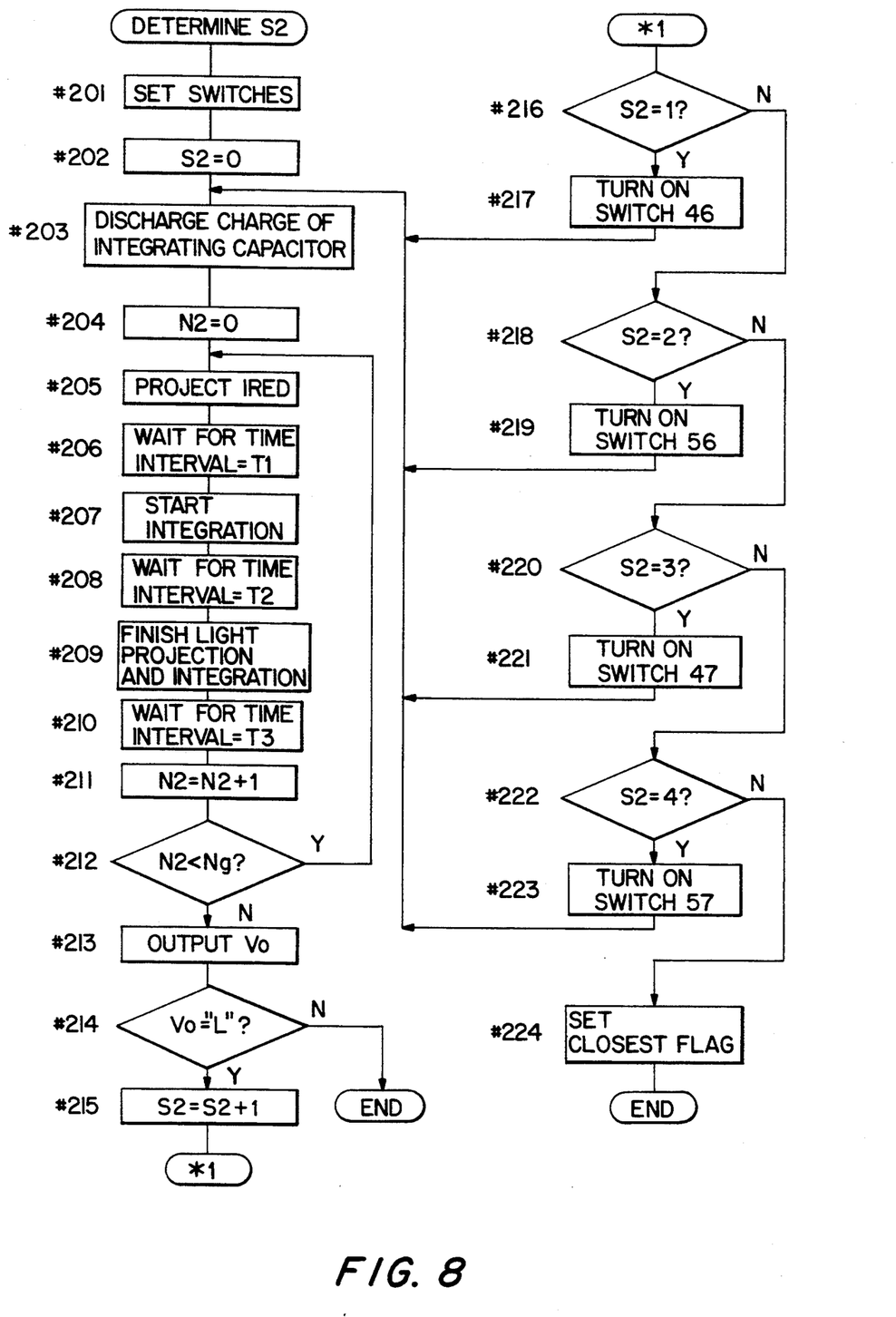
FIG. 8 is a flowchart representing a subroutine to determine a value S2 of the flowchart shown in FIG. 6.

Next, a subroutine for determining the value S2 will be described with reference to FIG. 8. The operation is almost the same as the case of determining the value S1. The CPU 80 turns on the switch 4 to the current-voltage converting circuit 30 and a suitable gain is determined by repeatedly adding 1 to the value S2 which is 1 byte data which is stored in an address in the RAM 81. When the operation is away from the subroutine, the value S2 which corresponds to the gain is determined, or the closest flag in the RAM 81 is set.

Figure 9:
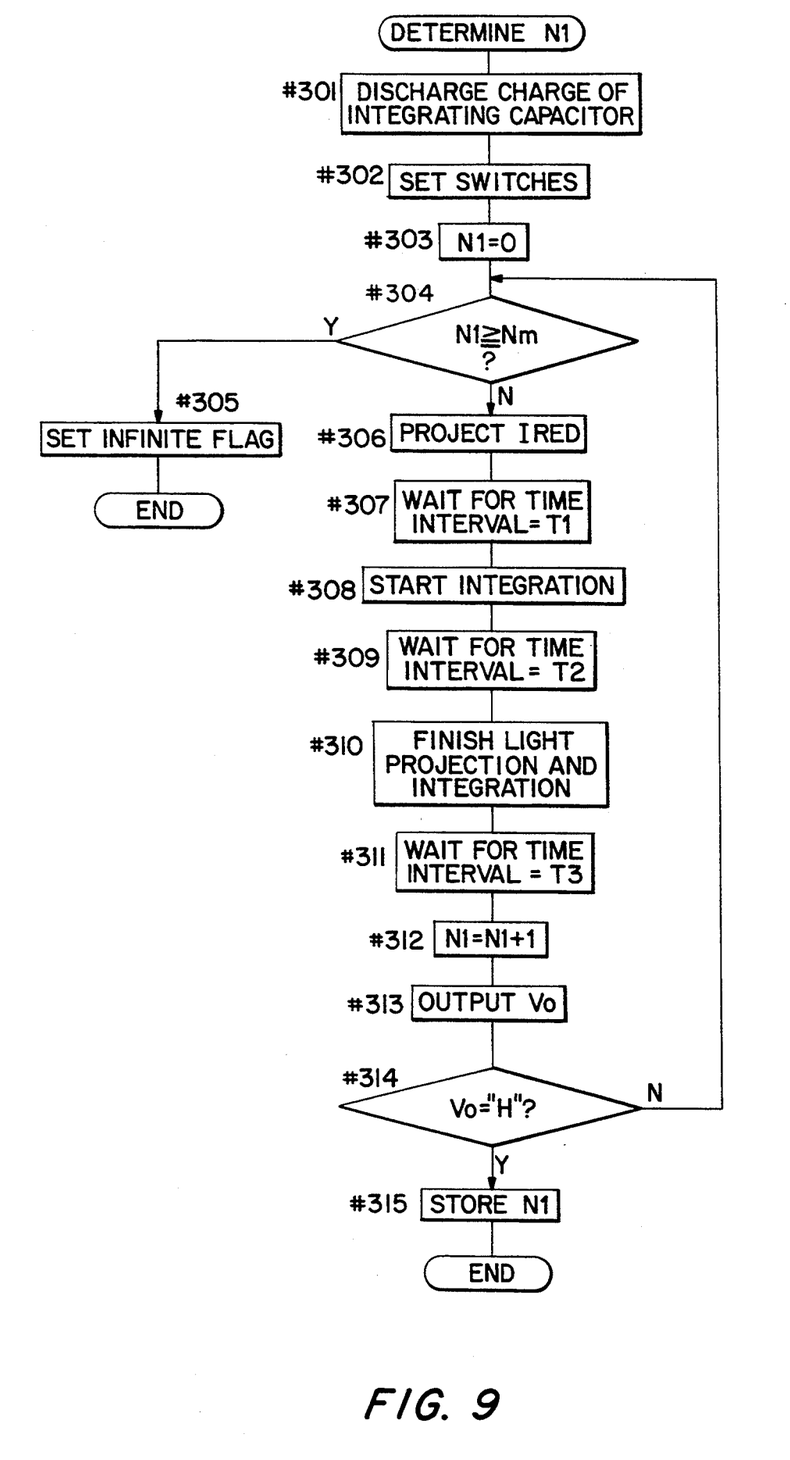
FIG. 9 is a flowchart representing a subroutine to determine a number N1 of the flowchart shown in FIG. 6.

Subsequently, a subroutine for determining the number of times N1 will be explained with reference to FIG. 9. When the operation calls the subroutine, the switch 64 is turned on by the CPU 80 so that the charge left in the integrating capacitor 63 is discharged, then the switch 64 is turned off (#301). Thereafter, the switch 4 is turned on to the current-voltage converting circuit 20, the switch 72 is turned on to the reference voltage 74 side (#302), and the number of times N1 of the counter 83 is cleared to zero (#303). Subsequently, it is determined whether the number of times N1 is more than the number of times Nm or not. If the number N1 is more than the number Nm, the infinite flag in the RAM 81 is set to return the operation back to the main routine (#305). If the number is less than the number Nlim, the operation goes to #306 (#304).

Subsequently, after the light projection circuit 10 is operated by the CPU 80 (#306) and a waiting state is continued for a time period T1 (#307), a waiting state is continued for a time period T2 (#309) while turning on the switch 7 and performing the integrating operation (#308). During the period T2, charge is stored in the integration capacitor 63. Then the operation of the light projection circuit 10 is stopped to finish the projection operation, and the switch 7 is turned off to complete the integrating operation (#310). A waiting state is continued for a time period T3 (#311). One is added to the counter 83 (#312). The integrated voltage Vi is output to the comparator 71. The comparator 71 compares the voltage Vi with the reference voltage V2, and as a result, outputs the voltage Vo to the CPU 80 (#313). The CPU 80 judges the level of the voltage Vo (#314). If it is "H" level, the number of times N1 of the counter 83 is stored in the RAM 81 (#315) and the operation returns to the main routine. If it is "L" level, the operation jumps to #304.

Figure 10:
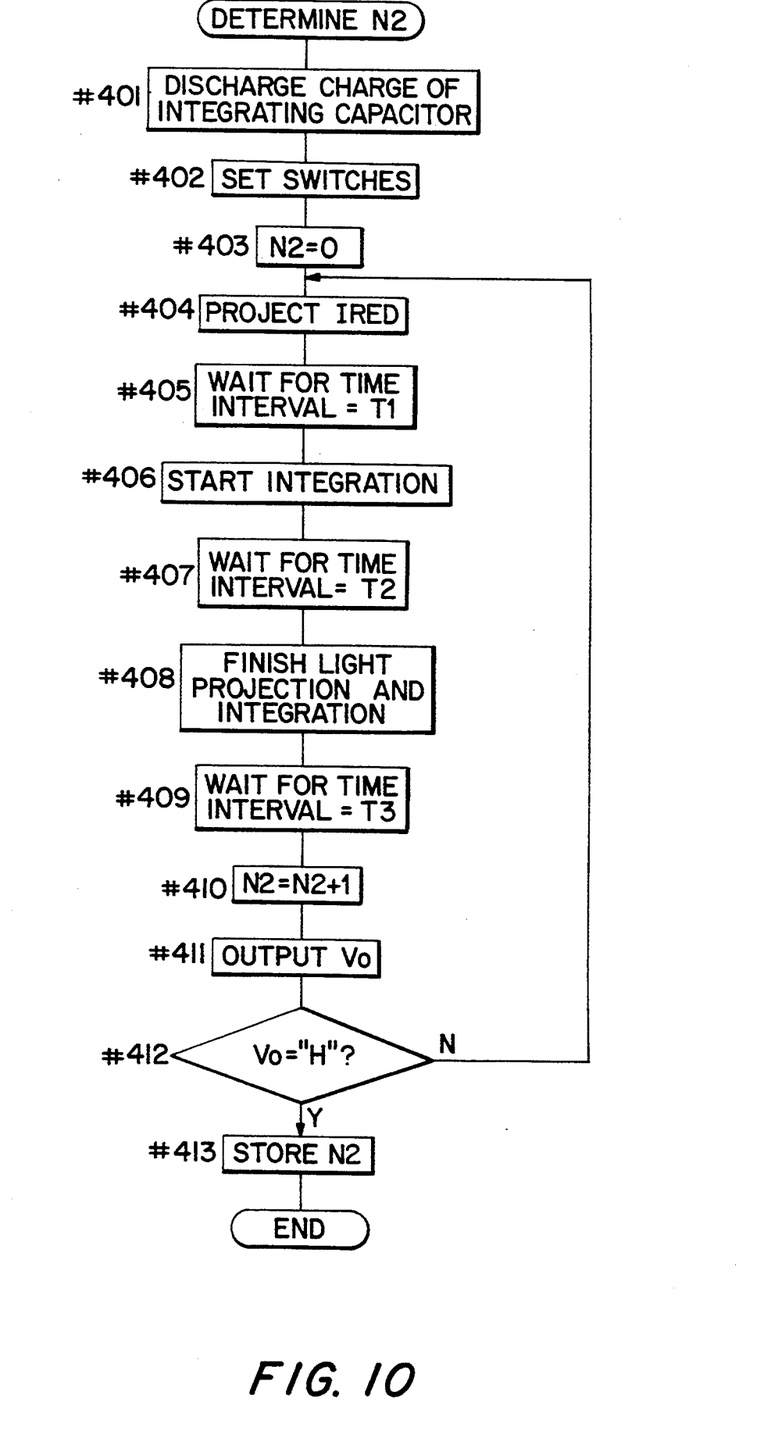
FIG. 10 is a flowchart representing a subroutine to determine a number N2 of the flowchart shown in FIG. 6.
Figure 11:
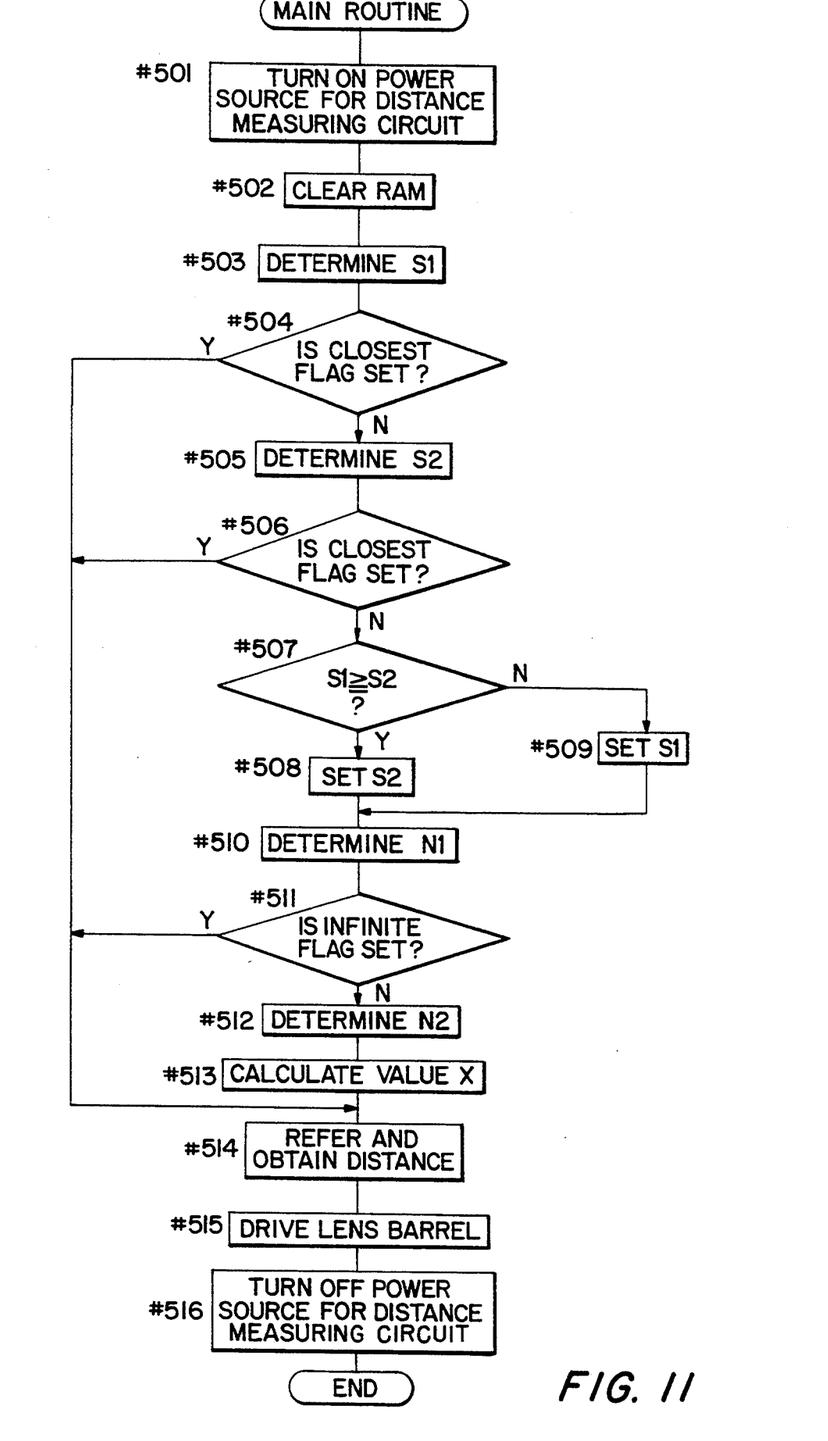
FIG. 11 is a flowchart representing an operation of another embodiment of the invention.

Subsequently, a subroutine for determining the number of times N2 will be explained with reference to FIG. 10. When the operation calls the subroutine, the switch 64 is turned on by the CPU 80 so that the charge left in the integrating capacitor 63 is discharged, and then the switch 64 is turned off (#401). Thereafter, the switch 4 is turned on to the current-voltage converting circuit 30, the switch 72 is turned on to the reference voltage 74 side (#402), and the number of times N2 of the counter 84 is cleared to zero (#403). Subsequently, the light projection circuit 10 is operated by the CPU 80 (#404) and a waiting state is continued for a time period T1 (#405), a waiting state is continued for a time period T2 (#407) while turning on the switch 7 and performing the integrating operation (#406). During the period T2, charge is stored in the integration capacitor 63. Then the operation of the light projection circuit 10 is stopped to finish the projection operation, and the switch 7 is turned off to complete the integrating operation (#408). A waiting state is continued for a time period T3 (#409). One is added to the counter 84 (#410). The integrated voltage Vi is output to the comparator 71. The comparator 71 compares the voltage Vi with the reference voltage V2, and as a result, outputs the voltage Vo to the CPU 80 (#411). The CPU 80 judges the level of the voltage Vo (#412). If it is "H" level, the number of times N2 of the counter 84 is stored in the RAM 81 (#413) and the operation returns to the main routine. If it is "L" level, the operation jumps to #404. By the foregoing operation, the distance to the object is measured.

According to another embodiment of the invention, the gain of the amplifying circuit 40 and the amplifying circuit 50 may be set smaller to enhance the distance measuring precision. In such a case, when the value S1 and the value S2 are determined, the switches 46, 47, 56 and 57 are set according to the switches state of larger value rather than smaller value as in the preceding embodiment. The main routine will be explained with reference to FIG. 11. When the operation enters into this distance measuring routine, the CPU 80 turns on the power supplies of the overall distance measuring circuit (#501) and clears the content of the RAM 81 (#502). Subsequently, the CPU 80 determines the value S1 (#503), then checks the state of the closest flag. If it is set, the operation jumps to #514 (#504). Further, the value S2 is determined (#505), then the state of the infinite flag is checked. If it is set, the operation jumps to #514 (#506). The values S1 and S2 in the RAM 81 are compared (#507) and the switch 46, the switch 47, the switch 56, and the switch 57 are set again according to the switches state of larger value (#508, #509).

The distance measuring operation is performed by the current-voltage converting circuit 20, and the number of times N1 is stored in RAM 81 (#510). Then the state of the infinite flag is checked. If it is set, the operation jumps to #514 (#511). In the same way, the distance measuring operation is performed by the current-voltage converting circuit 30 and the number of times N2 is stored in the RAM 81 (#512). The number N1 and the number N2 stored in the RAM 81 by the operation of the subroutines #510 and #512 are read out to calculate the value X (#513). As a result, if the infinite flag is set, it is judged that the object is located at the infinite position, and if the closest flag is set, it is judged that the object is located at the closest position. Except for these condition, the distance to the object is obtained by referring to the address (FIG. 5) of the ROM 82 which is predetermined by the value of X (#514). Then the lens barrel 86 is driven to the focusing position by controlling the motor 85 (#515). Finally, the power supply of the distance measuring circuit is turned off (#516) and the operation changes to another routine. The subroutines are the same as FIG. 7 to FIG. 10.

According to the structure of the present invention, it is possible to determine a suitable gain for the light receiving circuit and to measure the distance to the object on the basis of the setup of the gain without using an A/D converting circuit. Accordingly, measurement with a simple and inexpensive circuit can be achieved.

Furthermore, since the distance to the object is calculated by using the projecting number of times for the near distance measuring operation and the far distance measuring operation without converting the voltage appearing between the terminals of the integrating capacitor into a digital signal, the distance measurement can be performed at high precision by a simple and inexpensive circuit.

We claim:

1. A distance measuring device comprising: light projecting means for projecting light toward an object; light receiving means for receiving light projected from the light projecting means and reflected from the object and for converting the reflected light into two output currents; a first current-voltage converting circuit for converting one of the output currents of the light receiving means into a first output voltage; a second current-voltage converting circuit for converting the other of the output currents of the light receiving means into a second output voltage; a selecting circuit for selecting one of the first and second output voltages from the current-voltage converting circuits and for outputting the selected output voltage; a variable-gain amplifying circuit for amplifying the selected output voltage and for producing a corresponding amplified output voltage; an integrating circuit for integrating the amplified output voltage and for producing an integrated output voltage; reference voltage generating means for generating first and second reference voltages having different levels; comparing means for comparing the integrated output voltage with one of the first and second reference voltages generated by the reference voltage generating means and for producing a corresponding comparison output signal; gain selecting means for selecting a gain of the variable-gain amplifying circuit in accordance with the comparison output signal of the comparing means; and calculating means for calculating a distance to the object in accordance with the duration of time integration is performed by the integrating circuit until the integrated output voltage exceeds one of the reference voltages generated by the reference voltage generating means.

2. In an electronic camera of the type having a motor for driving a lens barrel to achieve automatic focus of a lens in response to partial depression of a shutter release button, a distance measuring device according to claim 1; wherein the distance measuring device has an output for driving the motor in accordance with the calculated distance so that the object is brought into proper focus, 3. A distance measuring device according to claim 1; wherein the light projecting means comprises an infrared light-emitting diode; and the light receiving means comprises a semiconductor position sensitive device.

4. A distance measuring device according to claim 1; wherein the light projecting means includes means for projecting pulsed light for a predetermined number of times; and the gain selecting circuit includes means for setting a gain of the variable-gain amplifying circuit to a maximum permissible value and for reducing the gain in a step-wise manner until the integrated output voltage falls below one of the reference voltages to select the proper gain for the variable-gain amplifying circuit, 5. A distance measuring device according to claim 1; wherein the light projecting means includes means for projecting pulsed light; and the integrating circuit includes means for integrating the amplified output voltage of the amplifying circuit corresponding to each light pulse received by the light receiving means and for counting the number of integrations until the integrated output voltage equals one of the reference voltages such that the distance to the object may be determined.

6. A distance measuring device comprising:
light projecting means for projecting pulse light toward an object;
light receiving means for receiving light projected from the light projecting means and reflected from the object;
current-voltage converting means for converting an output current of the light receiving means into respective output voltages;
amplifying means for amplifying the respective output voltages of the current-voltage converting means and for producing respective amplified output voltages;
integrating means for integrating the output voltages of the amplifying means and for producing an integrated output signal;
level judging means for judging a level of the output signal of the integrating means and for producing an output signal to stop the light projecting operation of the light projecting means when the level of the output signal of the integrating means reaches a predetermined value;
counting means for counting the number of light pulses projected by the light projecting means; and
calculating means for calculating a distance to the object in accordance with the counted number of pulses.

7. A distance measuring device according to claim 6; wherein the light projecting means comprises an infrared light-emitting diode; and the light receiving means comprises a semiconductor position sensitive device.

8. A distance measuring device according to claim 6; wherein the amplifying means is a variable-gain amplifying means; and further including gain selecting means for setting a gain of the variable-gain amplifying means to a maximum permissible value and for reducing the gain in a step-wise manner until the integrated output signal falls below a predetermined value to select the proper gain of the variable-gain amplifying means.

9. A distance measuring device according to claim 6; wherein the integrating means includes means for integrating the amplified output voltages of the amplifying means corresponding to each received light pulse and for counting the number of integrations until the integrated output signal equals a predetermined value such that the distance to the object may be determined in accordance with the counted number of integrations.

10. A distance measuring device comprising: light projecting means for projecting pulsed light toward an object; light receiving means for receiving light pulses reflected from the object and for producing a corresponding electrical output signal; variable-gain amplifying means for amplifying the electrical output signal and producing an amplified output signal corresponding to each light pulse received by the light receiving means; integrating means for integrating the amplified output signal and producing an integrated output signal; comparing means for comparing the integrated output signal with a reference signal and producing a comparison output signal; and gain selecting means for selecting the gain of the variable-gain amplifying means in accordance with the comparison output signal; wherein the integrating means includes means for integrating the amplified output signal of the amplifying means corresponding to each light pulse received by the light receiving means and for counting the number of integrations until the integrated output voltage equals the reference signal such that the distance to the object may be determined in accordance with the counted number of integrations.

11. A distance measuring device according to claim 10; wherein the light projecting means comprises an infrared light-emitting diode; and the light receiving means comprises a semiconductor position sensitive device.

12. A distance measuring device according to claim 10; wherein the light receiving means comprises a light receiving element for producing at least one current signal in response to incident light, and a current-voltage converting means for converting an output current of the light receiving element into a corresponding voltage signal.

13. A distance measuring device according to claim 10; wherein the light receiving means comprises a light receiving element for receiving light and converting received light into two output currents, a first current-voltage converting circuit for converting one of the output currents of the light receiving element into a first output voltage, and a second current-voltage converting circuit for converting the other of the output currents of the light receiving element into a second output voltage.

14. A distance measuring device according to claim 10; wherein the light projecting means includes means for projecting pulsed light for a predetermined number of times; and the gain selecting means includes means for setting a gain of the variable-gain amplifying means to a maximum permissible value and for reducing the gain in a step-wise manner until the integrated output signal falls below the reference signal to select the proper gain for the variable-gain amplifying means.

* * * * *